(12) United States Patent
Kim et al.

(10) Patent No.: US 10,484,294 B2
(45) Date of Patent: *Nov. 19, 2019

(54) APPARATUS AND METHOD FOR CONFIGURING MMT PAYLOAD HEADER

(71) Applicants: Electronics and Telecommunications Research Institute, Daejeon (KR); YONSEI UNIVERSITY WONJU INDUSTRY-ACADEMIC COOPERATION FOUNDATION, Wonju-si, Gangwon-do (KR)

(72) Inventors: Chang-Ki Kim, Daejeon (KR); Jeong-Ju Yoo, Daejeon (KR); Jin-Woo Hong, Daejeon (KR); Kwang-Deok Seo, Wonju-si (KR); Hong-Rae Lee, Wonju-si (KR)

(73) Assignees: Electronics and Telecommunications Research Institute, Daejeon (KR); YONSEI UNIVERSITY WONJU INDUSTRY-ACADEMIC COOPERATION FOUNDATION, Wonju-si, Gangwon-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,035

(22) Filed: Oct. 11, 2018

(65) Prior Publication Data
US 2019/0044877 A1 Feb. 7, 2019

Related U.S. Application Data

(63) Continuation of application No. 15/031,540, filed as application No. PCT/KR2014/009766 on Oct. 17, 2014, now Pat. No. 10,129,164.

(30) Foreign Application Priority Data

Oct. 23, 2013 (KR) .................. 10-2013-0126824
Jul. 11, 2014 (KR) .................. 10-2014-0087797
Oct. 6, 2014 (KR) .................. 10-2014-0134583

(51) Int. Cl.
H04L 12/28 (2006.01)
H04L 12/805 (2013.01)
(Continued)

(52) U.S. Cl.
CPC ............ *H04L 47/365* (2013.01); *H04L 69/04* (2013.01); *H04L 47/34* (2013.01); *H04N 21/236* (2013.01)

(58) Field of Classification Search
CPC ....... H04L 47/365; H04L 69/04; H04L 47/34; H04N 21/236
See application file for complete search history.

(56) References Cited

U.S. PATENT DOCUMENTS 8,908,717 B2 12/2014 Agiwal et al.
9,106,376 B2 8/2015 Hwang et al.
(Continued)

FOREIGN PATENT DOCUMENTS

KR 1020130040149 A 4/2013
WO 2013077662 A1 5/2013
WO 2013112027 A1 8/2013

OTHER PUBLICATIONS

"Information technology—High efficiency coding and media delivery in heterogeneous environments—Part 1: MPEG Media Transport (MMT)," International Standard, ISO/IEC DIS 23008-1, Jun. 1, 2014, pp. 1-98, ISO/IEC.

*Primary Examiner* — Phuc H Tran
(74) *Attorney, Agent, or Firm* — William Park & Associates Ltd.

(57) ABSTRACT

Disclosed are an apparatus and a method for configuring an MMT payload header. The apparatus for configuring an MMT payload header, according to one embodiment, extracts a sequence number of a media processing unit
(Continued)

(MPU) comprising one or a plurality of media fragment units, which are to be aggregated into one payload and mapped, and displays the extracted sequence number of the MPU on the MMT payload header. Specifically, the apparatus for configuring an MMT payload header displays the sequence number commonly associated with a plurality of MFUs on the header only once, when the plurality of MFUs in one payload are aggregated in the one payload and mapped.

6 Claims, 12 Drawing Sheets

(51) Int. Cl.
 *H04L 29/06* (2006.01)
 *H04L 12/801* (2013.01)
 *H04N 21/236* (2011.01)

(56) References Cited

U.S. PATENT DOCUMENTS

| | | | |
|---|---|---|---|
| 9,288,011 | B2 | 3/2016 | Hwang et al. |
| 9,450,702 | B2 | 9/2016 | Hwang et al. |
| 9,544,641 | B2 | 1/2017 | Yie et al. |
| 9,554,417 | B2 | 1/2017 | Ho et al. |
| 2010/0232356 | A1 | 9/2010 | Maheshwari et al. |
| 2012/0320925 | A1 | 12/2012 | Park et al. |
| 2013/0074141 | A1 | 3/2013 | Hwang et al. |
| 2013/0094563 | A1 | 4/2013 | Bae |
| 2013/0290814 | A1 | 10/2013 | Hwang et al. |
| 2014/0109159 | A1* | 4/2014 | Rhyu ............... H04N 21/6156 725/109 |
| 2014/0314157 | A1* | 10/2014 | Hwang ............... H04N 19/89 375/240.27 |
| 2014/0314158 | A1 | 10/2014 | Hwang et al. |
| 2014/0317664 | A1* | 10/2014 | Park ............... H04N 21/23614 725/109 |
| 2014/0334504 | A1* | 11/2014 | Yie ............... H04H 20/18 370/474 |
| 2014/0369222 | A1* | 12/2014 | Kim ............... H04L 65/4076 370/252 |
| 2014/0376552 | A1 | 12/2014 | Hwang et al. |
| 2015/0023249 | A1 | 1/2015 | Hwang et al. |
| 2015/0089560 | A1* | 3/2015 | Park ............... H04L 65/607 725/116 |
| 2015/0113577 | A1* | 4/2015 | Yie ............... H04N 21/2362 725/109 |
| 2015/0249835 | A1* | 9/2015 | Yie ............... G06F 11/076 375/240.02 |
| 2015/0373380 | A1 | 12/2015 | Tsukagoshi |
| 2016/0112731 | A1 | 4/2016 | Tsukagoshi |
| 2016/0149994 | A1 | 5/2016 | Kitazato |
| 2016/0352460 | A1* | 12/2016 | Hwang ............... H04L 1/004 |

* cited by examiner

APPARATUS AND METHOD FOR CONFIGURING MMT PAYLOAD HEADER

TECHNICAL FIELD

The following description is generally relates to a technology for providing a media transport service based on a Moving Picture Experts Group (MPEG) media transport system, and more particularly to an apparatus and method for constructing MPEG Media Transport (MMT) payload header to reduce overhead.

BACKGROUND ART

MPEG Media Transport (MMT) is a new media transport standard technology developed by ISO/IEC WG11 (MPEG) system sub-working group in 2010.

In the existing MPEG-2 system, an MPEG-2 transport stream (TS) technology has been standardized for packetization, synchronization, and multiplexing for audio/video (AV) content transmission and now is widely used. However, in a packet transmission environment in which a network is based on an Internet protocol (IP), the MPEG-2 TS is inefficient.

Thus, ISO/IEC WG 11 MPEG has recognized the need for a new media transport standard and started MMT standardization, in consideration of a new media transport environment and a media transport environment expected in the future.

In an MMT payload header that is currently considered by the MPEG system sub-working group, an MPU sequence number (hereinafter referred to as an "MPU_sequence_number"), which represents a sequence number of a Media Processing Unit (MPU), is included in a data unit (DU) header.

In the case where a plurality of data units (DU) are aggregated in one payload, the number of DU headers included in the payload header corresponds to the number of aggregated DUs. If the aggregated DUs are media fragment units (MFUs), these MFUs are fragments extracted from a same MPU, and thus have a same MPU_sequence_number.

Accordingly, in the case where a plurality of MFU DUs are aggregated in one payload, each of the MFU DU headers includes a same MPU_sequence_number, in which the same MPU_sequence_number is repeated unnecessarily in an MMT payload header for a number of times corresponding to the number of MFU data units.

Meanwhile, the MMT payload header of current MMT standard does not include an MFU sequence number (hereinafter referred to as an "MFU_sequence_number"), which represents a sequence number of MFU included in an MPU. The MFU_sequence_number is important information that indicates sequential relations between MFUs in an MPU. Thus the MFU_sequence_number can be used for both a receiving entity and a sending entity to identify a sequence number of an MFU lost in a transmission process in the case where a discontinuous increase of MFU sequence number values occurs. Accordingly, MFU sequence number information is required to be included at an appropriate position in an MMT payload header.

Technical Problem

The present invention provides an apparatus and method for constructing an MMT payload header, which may reduce overhead by avoiding repeat of an MPU_sequence_number in the case of aggregating a plurality of MFU DUs in one MMT payload.

Further, the present invention provides an apparatus and method for constructing an MMT payload header, in which sequential relations between MFUs included in one MMT payload may be easily identified.

Technical Solution

In one general aspect, there is disclosed an apparatus for constructing an MPEG Media Transport (MMT) payload header, the apparatus comprising: a payload header constructing unit configured to extract an MPU_sequence_number of a Media Processing Unit (MPU) to which one Media Fragment Unit (MFU) or a plurality of MFUs to be aggregated and mapped into one payload belong, and configured to include the extracted MPU_sequence_number in the MMT payload header.

In another general aspect, there is disclosed an apparatus for constructing an MMT payload header, the apparatus comprising: an MFU counting unit configured to determine whether there are more than one MFU to be aggregated and mapped into one payload; and a payload header constructing unit configured to include once, in the MMT payload header, an MPU_sequence_number of an MPU to which more than one MFU belong.

In still another general aspect, there is disclosed a method of constructing an MMT payload header on a delivery function layer of an MMT system, the method comprising: extracting an MPU_sequence_number of an MPU to which one MFU or a plurality of MFUs to be aggregated and mapped into one payload belong; and including the extracted MPU_sequence_number of the MPU in the MMT payload header.

The method may further include determining whether there are more than one MFU to be aggregated and mapped into one payload, wherein the including of the extracted MPU_sequence_number of the MPU in the MMT payload header comprises including once, in the MMT payload header, the MPU_sequence_number of the MPU to which more than one MFU belong.

Advantageous Effects

According to the present disclosure, same MPU_sequence_numbers are not repeated in one MMT payload header when aggregating a plurality of MFU DUs in one MMT payload, thereby preventing unnecessary increase in a header size. Further, sequential relations between the MFUs included in an MMT payload may be easily identified.

MODE FOR INVENTION

The present invention now will be described more fully hereinafter with reference to the accompanying figures. In the following description, a detailed description of known functions and configurations incorporated herein will be omitted when it may obscure the subject matter with unnecessary detail. Terms used throughout this specification are defined in consideration of functions according to exemplary embodiments, and can be varied according to a purpose of a user or manager, or precedent and so on. Therefore, definitions of the terms should be made on the basis of the overall context.

Figure 1:
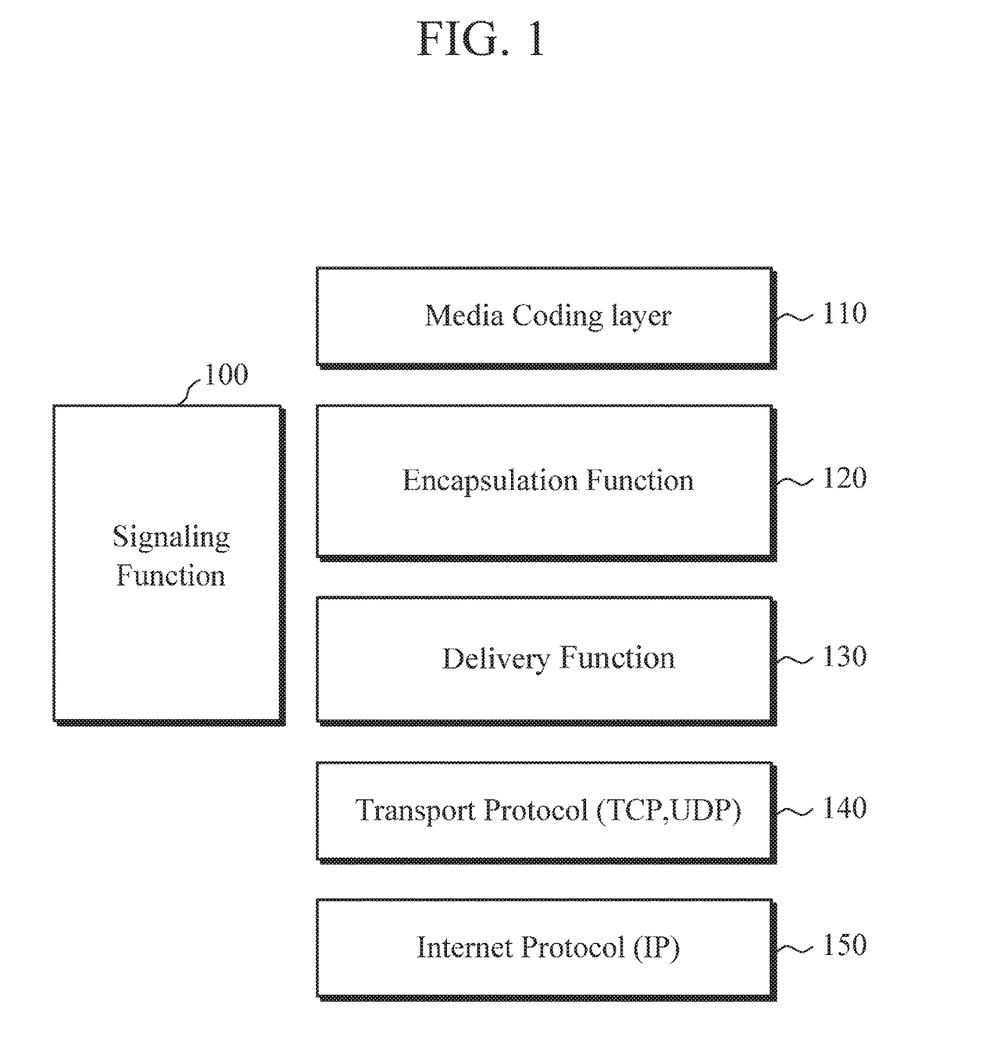
FIG. 1 is a diagram illustrating a hierarchical structure of an MMT system.

FIG. 1 is a diagram illustrating a hierarchical structure of an MMT system. FIG. 1 illustrates a media coding layer 110 to form and transport a multimedia data packet, an encapsulation function layer (E Layer) 120, a delivery function layer (D Layer) 130, a transport protocol layer 140, an Internet Protocol (IP) layer 150, and a signaling function layer (S Layer) 100.

Multimedia data compressed in the media coding layer 110 passes through the encapsulation function layer 120, and are packaged and output in a form similar to a file format. The encapsulation layer generates data segments as a small unit for an MMT service by using coded media data or stored media data as an input, and generates access units for the MMT service using the data segments. In addition, the encapsulation layer generates a packet format for creation, storage, and transmission of composition content by combining and/or dividing the access units.

The delivery function layer 130 transforms data unit(s) output from the encapsulation layer into an MMT payload format, and then forms an MMT transport packet by applying an MMT transport packet header to the transformed data unit, or forms a real-time protocol (RTP) packet by use of an RTP that is an existing transport protocol.

The packets formed by the delivery function layer, passing through a transport protocol layer, such as a user datagram protocol (UDP) layer or a transport control protocol (TCP) layer, are finally Internet-protocol (IP)-packetized on an IP layer, and then the resultant packets are transmitted. The signaling function layer generates control information or signaling information, and transmits the generated information by adding it to data or through a separate signaling means.

The MMT payload format generated by the delivery function layer defines a logical structure of a media unit(s) to be delivered over the MMT protocol or RTP. The MMT payload is specified by a payload format for delivering the encapsulated data unit and different information over MMT layer protocols or other existing application transport protocols. The MMT payload provides streaming information and file transfer information. The data unit for streaming may be an MMT media fragment unit (MFU) or a media processing unit (MPU).

The MFU is a general container format that is independent of any specific media codecs and contains coded media data that can be independently processed by a media decoder. The MFU refers to a part of fragmented data of an MPU, and is the minimum unit that can be independently decoded. For example, in a case of encoding by use of one frame as an access unit, the MFU may be one video frame, or in another case, may be one slice contained in one frame.

The MPU is a container format that contains one or more MFUs and information regarding additional delivery and processing, and may contain various numbers of MFUs generated from a plurality of different access units. The MPU refers to an encoded media data unit that can be fully and independently processed by an MMT compliant entity, and may have a particular size (for example, 1 group of picture (GOP) for a video) according to an application environment. For example, the MPU may consist of a plurality of picture frames that constitute 1 GOP (for example, a video with a length of one second), and the MFU may include each picture frame. The MPU includes header fields according to given definition, and at least some of the header fields are essential for MPU processing.

Figure 2:
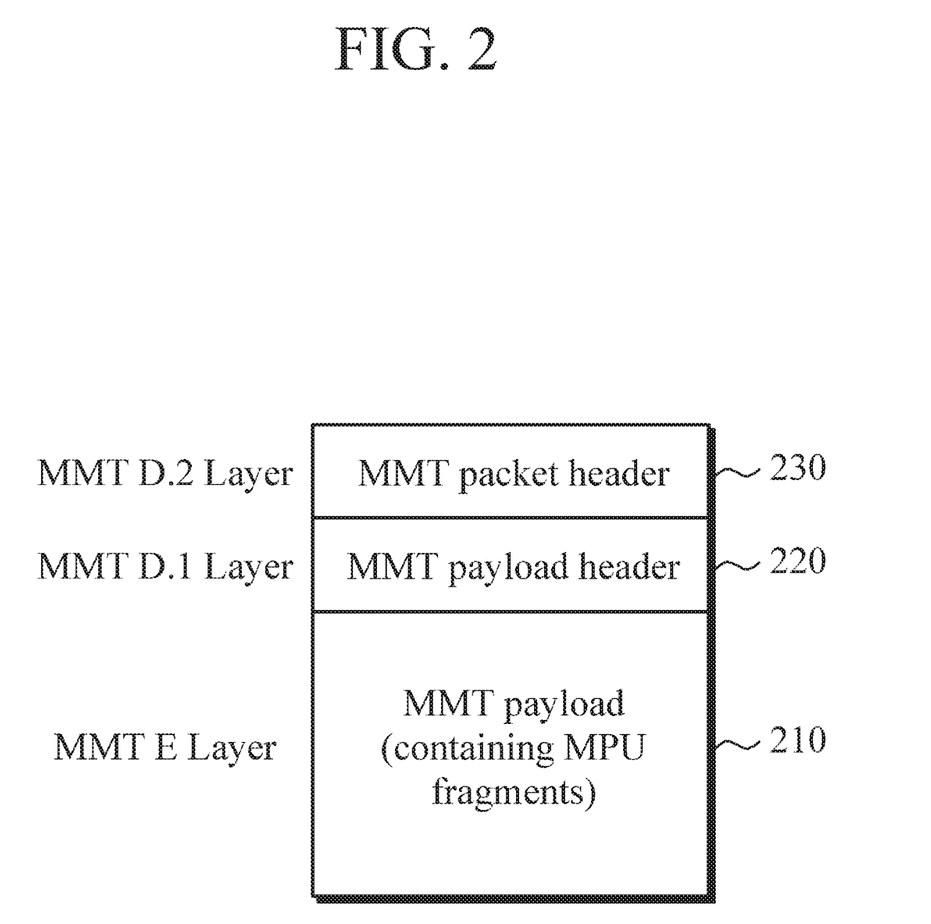
FIG. 2 is a diagram illustrating an internal structure of an MMT packet.

FIG. 2 is a diagram illustrating an internal structure of an MMT packet. Referring to FIG. 2, an MMT packet generates an MMT payload on the delivery function layer 130 based on an MPU file 210 generated on an encapsulation layer 120. Pieces of header information 220 and 230 are generated by identifying at least one piece of multimedia data, and a multimedia data packet is formed by combining the header information and at least one piece of multimedia data.

The present disclosure relates to an improved MMT payload header format for efficient media transport based on an MMT, in which the overhead in an MMT payload header, for example the MMT payload header 220 generated on the delivery function layer 130 as illustrated in FIG. 2, may be reduced.

Figure 3:
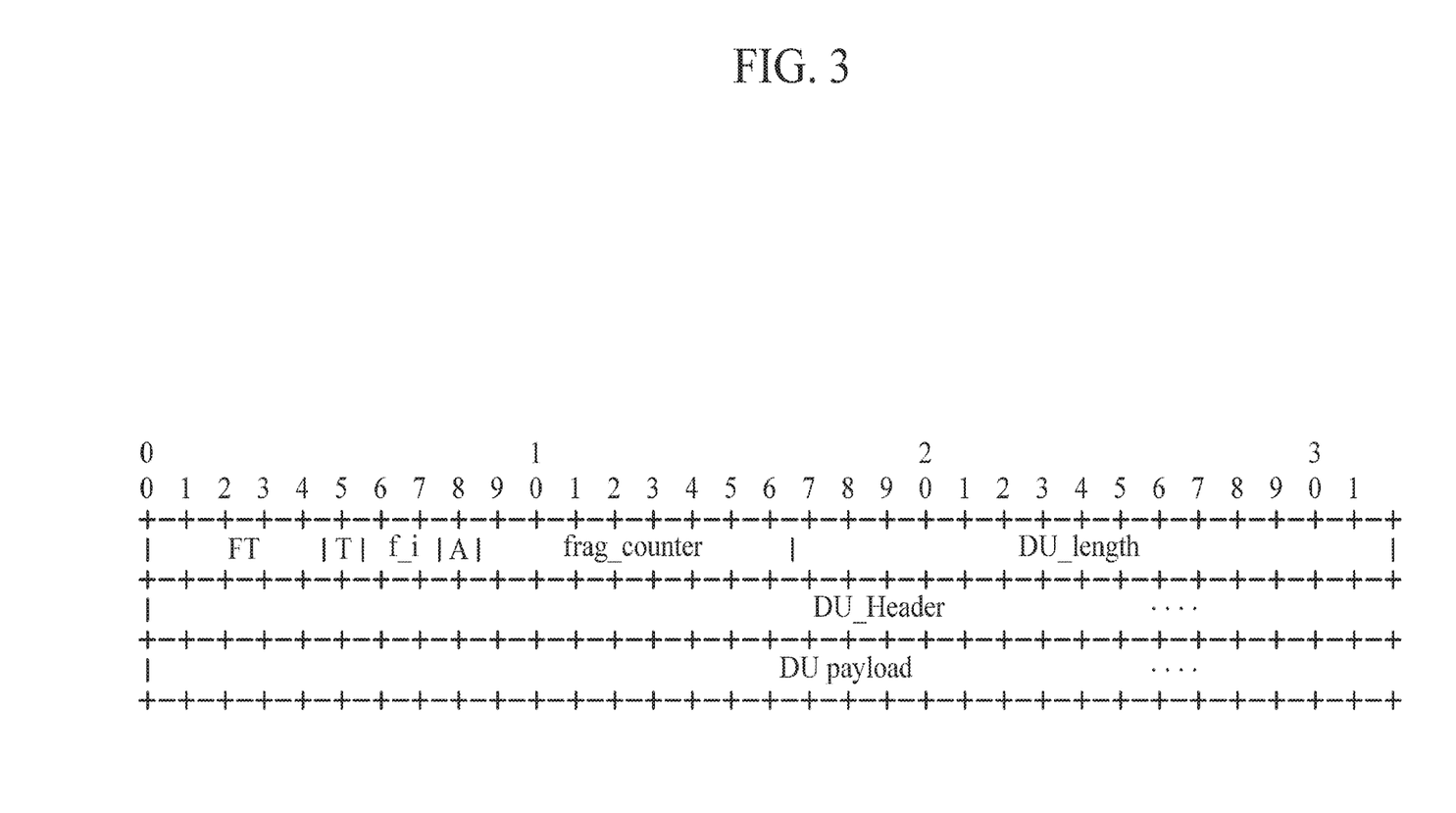
FIG. 3 is a diagram illustrating an MMT payload header structure that is currently considered by an MPEG system sub-working group.

FIG. 3 is a diagram illustrating an MMT payload header structure that is currently considered by an MPEG system sub-working group.

Figure 4:
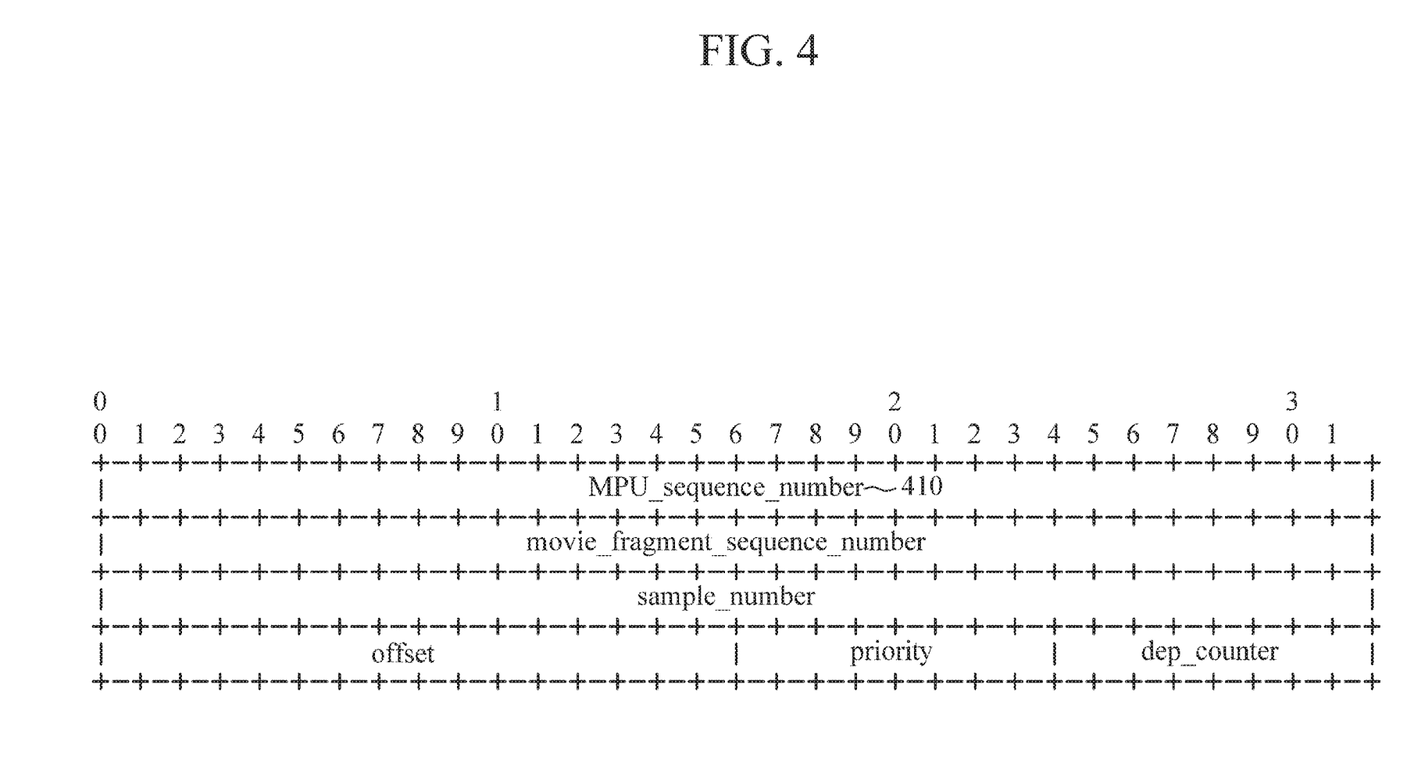
FIG. 4 is a diagram illustrating a DU header structure for timed media.
Figure 5:
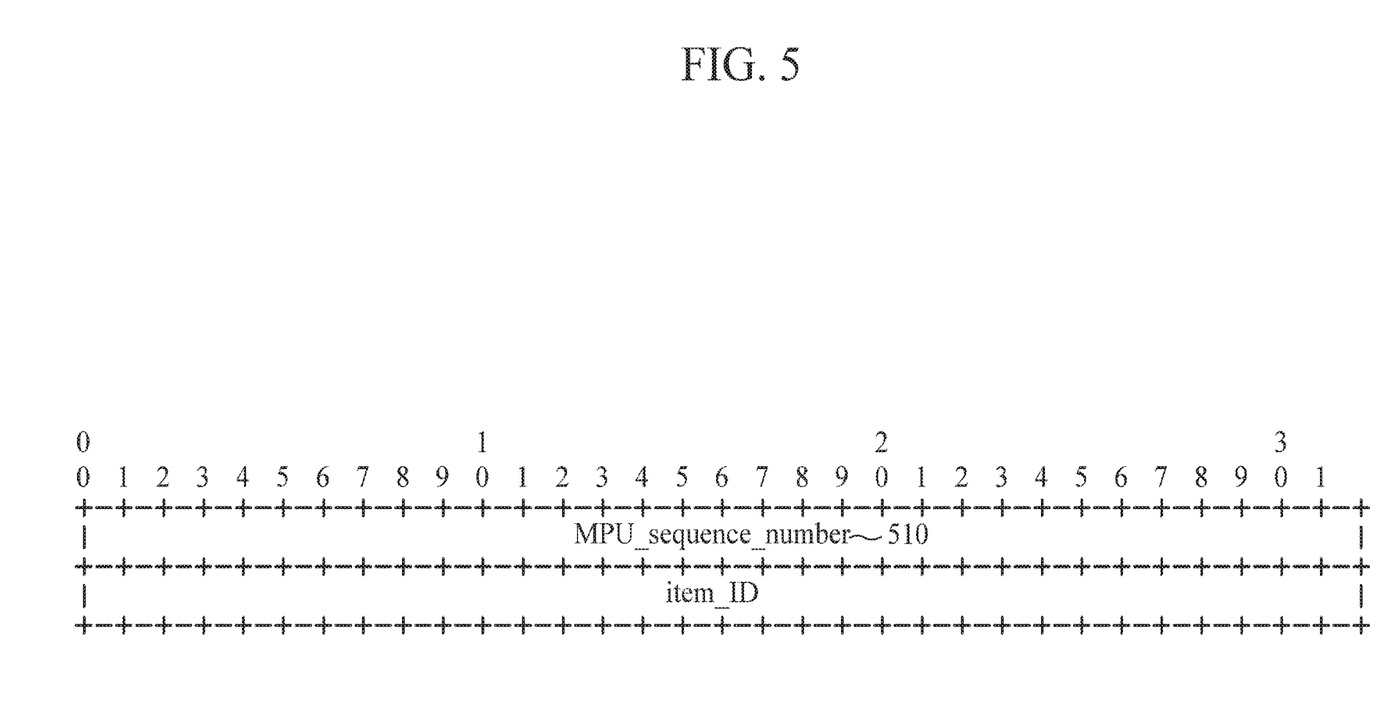
FIG. 5 is a diagram illustrating a DU header structure for non-timed media.

Referring to FIG. 3, the MMT payload header includes a DU header. FIG. 4 is a diagram illustrating a DU header structure for timed-media. FIG. 5 is a diagram illustrating a DU header structure for non-timed media.

Referring to FIGS. 4 and 5, MPU sequence numbers 410 and 510 that represent MPU sequence numbers are included in a DU header.

In the case where a plurality of data units (DUs) are aggregated into one payload, the number of DU headers in the payload header correspond to the number of aggregated DUs. If the aggregated data units are MFUs, these MFUs are fragments extracted from a same MPU, and thus have a same MPU_sequence_number. Accordingly, in the case where a plurality of MFU data units DUs are aggregated into one payload, all of a DU header included in each MFU data unit (DU) have a same MPU_sequence_number. In this case, a same MPU_sequence_number is repeated in an MMT payload header for a number of times corresponding to the number of MFU data units (DUs), thereby leading to unnecessary waste of bit amounts.

Figure 6:
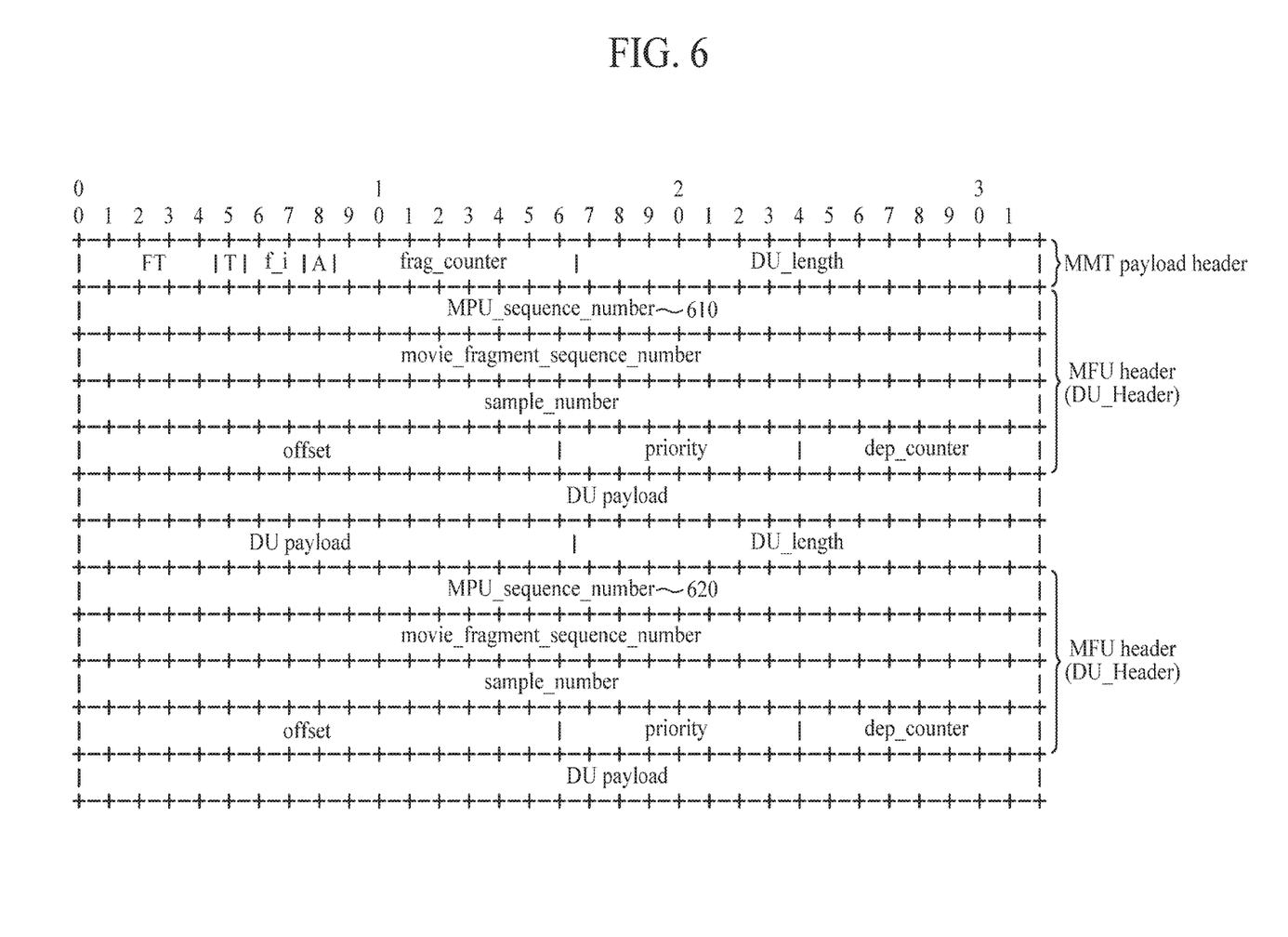
FIG. 6 is a diagram illustrating an MMT payload header structure in which two timed-media MFUs are aggregated.

FIG. 6 is a diagram illustrating an MMT payload header structure in which two timed-media MFUs are aggregated.

Referring to FIG. 6, MPU_sequence_numbers 610 and 620 with a same value are repeated twice in a payload header. As the number of MFU data units aggregated into one payload increases, the number of repeating times of the same MPU_sequence_number is also increased accordingly, in which it may be understood that the location of an MPU_sequence_number is not appropriate. Therefore, it is required to change a location where an MPU_sequence_number is included.

In the present disclosure, an MPU sequence number, i.e., an MPU_sequence_number, for one or a plurality of MFUs to be mapped into one payload is included in a payload header. That is, an MPU_sequence_number, which has been conventionally included in a DU header, is included in an MMT payload header. In this case, if a plurality of MFUs are aggregated to be mapped into one payload, there is no need to include each of the plurality of MPU_sequence_numbers in each of the MFUs, and only one MPU_sequence_number may be used to represent all the MFUs that are aggregated and included in a payload.

Figure 7:
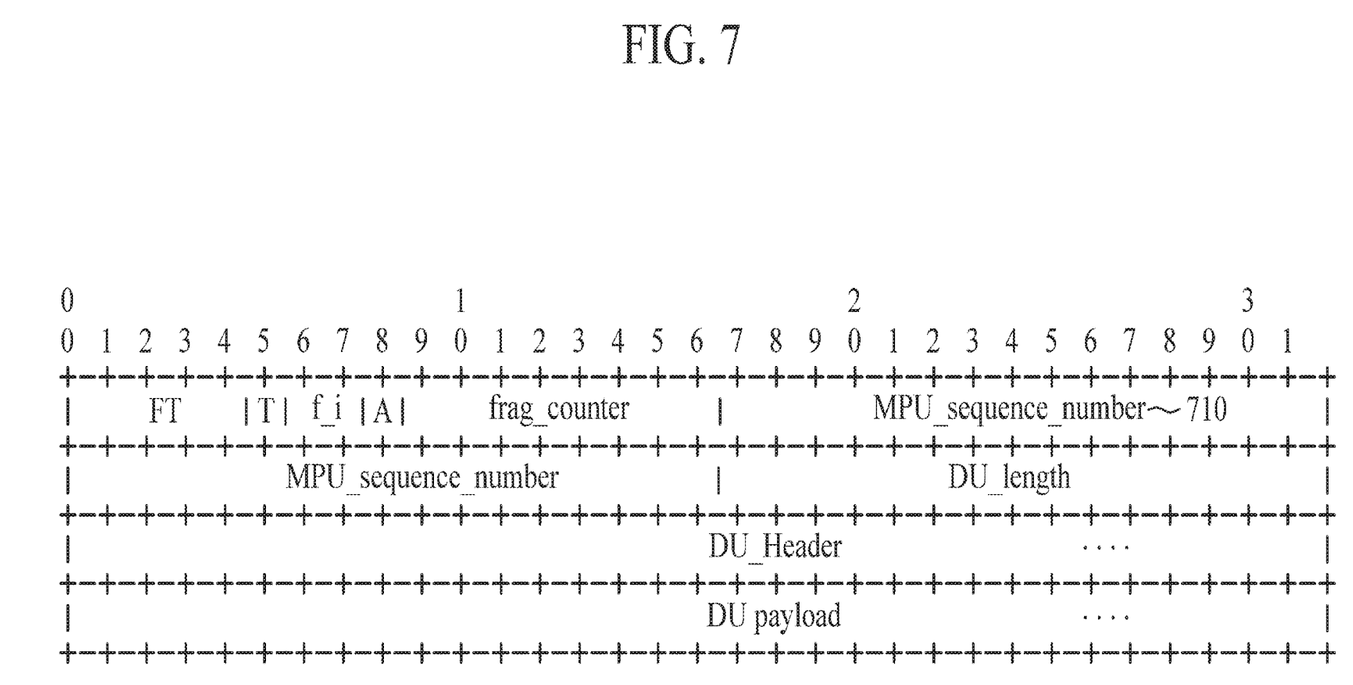
FIG. 7 is a diagram illustrating an MMT payload header structure according to an exemplary embodiment.

FIG. 7 is a diagram illustrating an MMT payload header structure according to an exemplary embodiment.

Referring to FIG. 7, an MPU_sequence_number is deleted from a DU header, and instead an MPU sequence number 710 is included in an MMT payload header.

Figure 8:
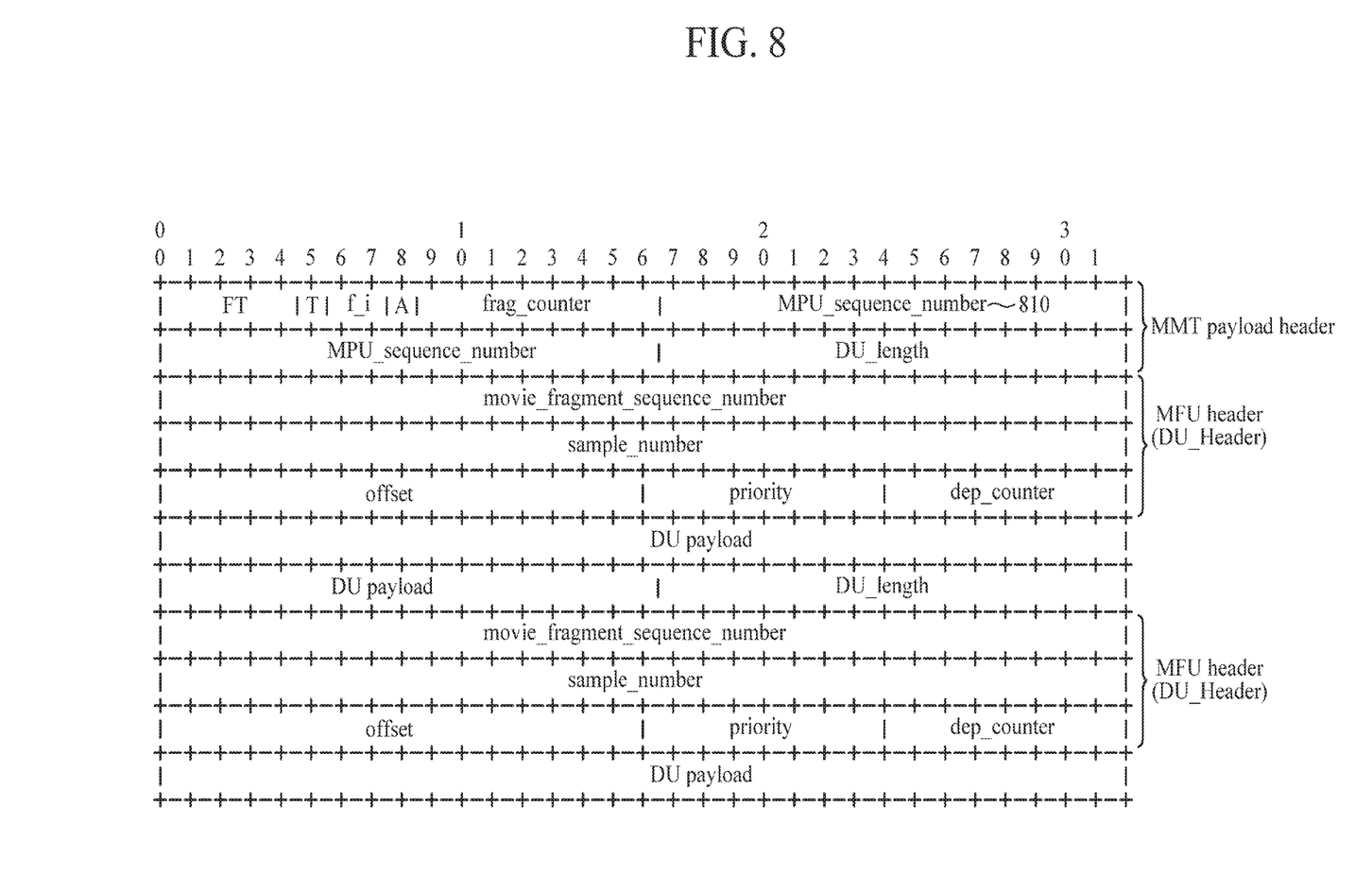
FIG. 8 is a diagram illustrating an MMT payload header structure, in which two timed-media MFUs are aggregated, according to an exemplary embodiment.

FIG. 8 is a diagram illustrating an MMT payload header structure, in which two timed-media MFUs are aggregated, according to the exemplary embodiment.

Referring to FIG. 8, unlike FIG. 6 in which an MPU_sequence_number is included twice, an MPU_sequence_number 810 is included only once, such that the size of a header required to construct a payload may be reduced. Accordingly, as the number of MFUs aggregated into one payload increases, the effect of reducing a header size is increased.

On the other hand, referring to FIGS. 3 to 5, an MFU sequence number, which is information to indicate a sequence number of MFUs included in an MPU, is not included in an MMT payload header. The MFU sequence number is important information that represents sequential relations between MFUs aggregated in the MPU. That is, based on the MFU sequence number, a receiving entity may identify a lost MFU sequence number from a discontinuous increase of the value of the MFU sequence number, and a sending entity also may identify an MPU_sequence_number lost in a transmission process. Accordingly, the MFU sequence number is required to be included at an appropriate position in a payload header. To this end, in the present disclosure, an MFU sequence number is additionally included in a DU header so that sequential relations between all the MFUs aggregated in one payload may be easily and clearly identified.

Figure 9A:
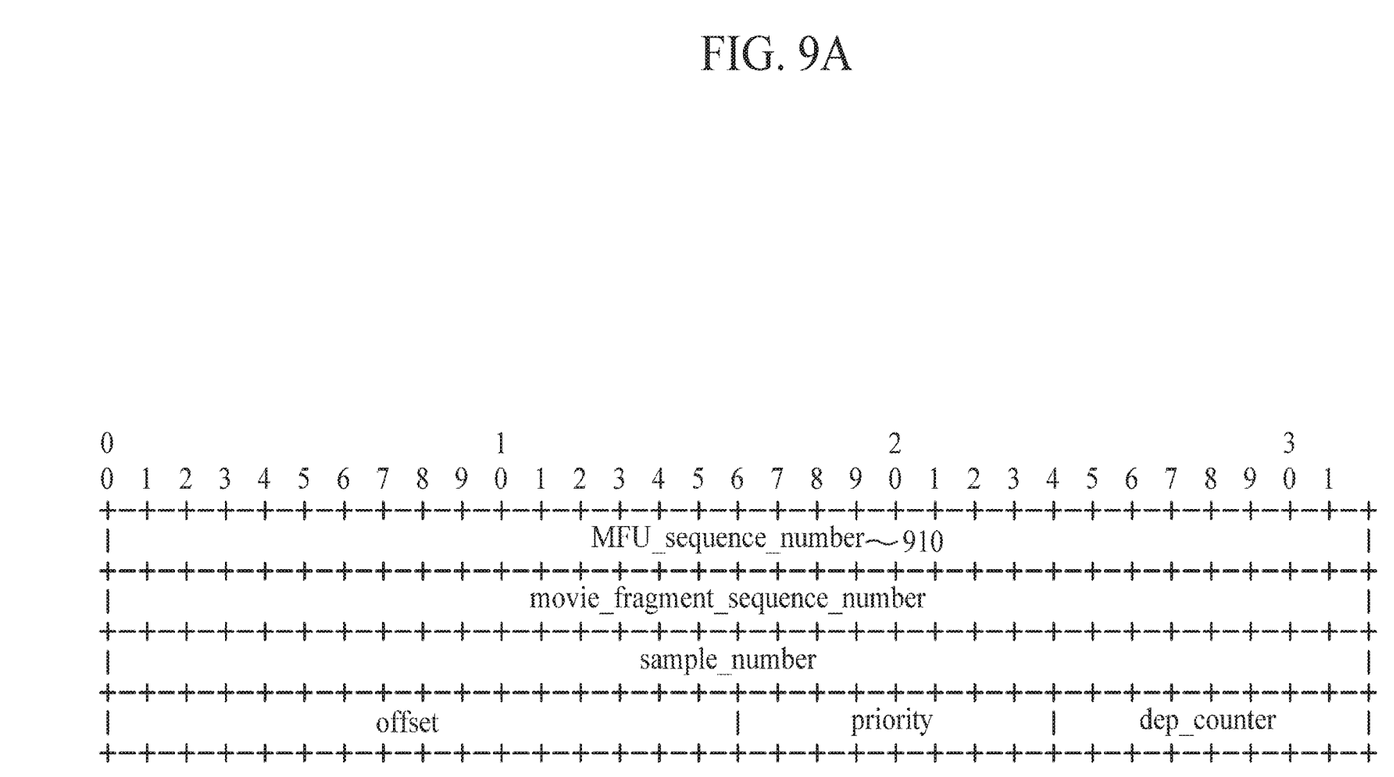
FIG. 9A is a diagram illustrating a DU header for a timed-media MFU according to an exemplary embodiment.
Figure 9B:
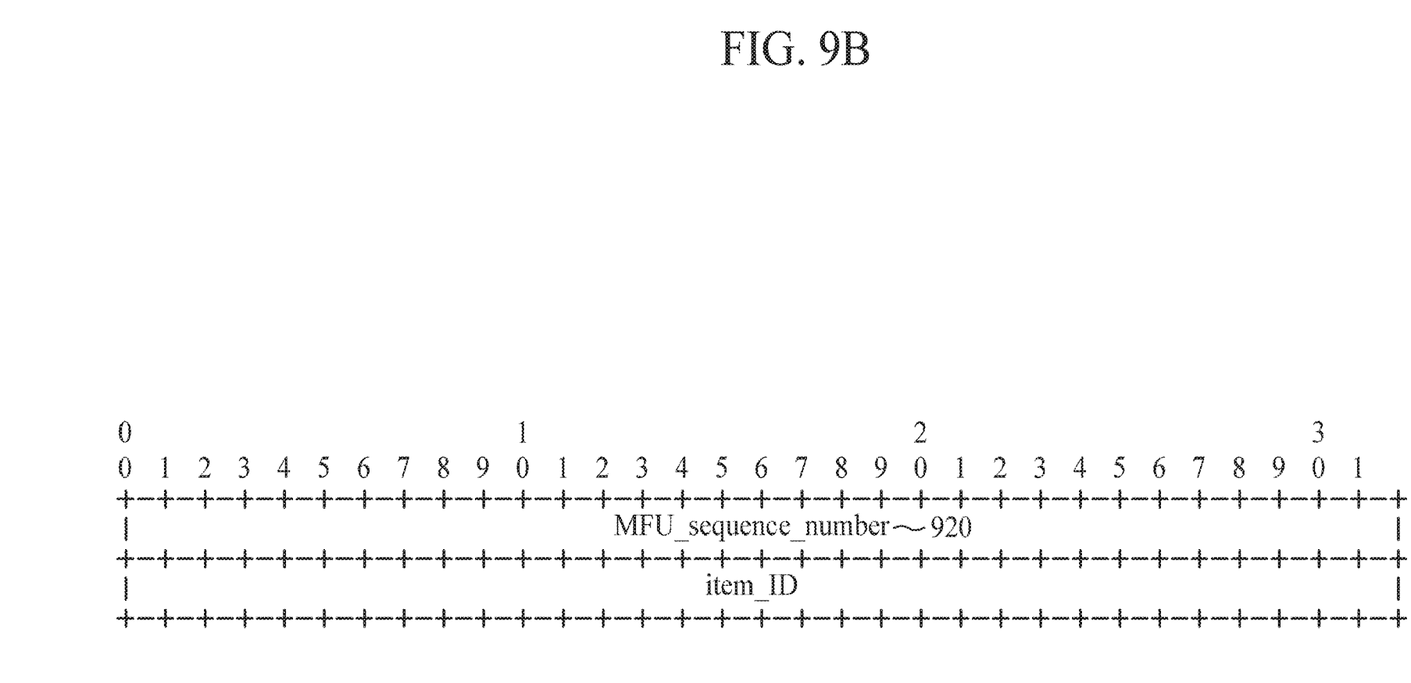
FIG. 9B is a diagram illustrating a DU header for a non-timed media MFU according to an exemplary embodiment.

FIG. 9A is a diagram illustrating a DU header for a timed-media MFU according to another exemplary embodiment. FIG. 9B is a diagram illustrating a DU header for a non-timed media MFU according to further another exemplary embodiment.

Referring to FIGS. 9A and 9B, MFU sequence numbers 910 and 920 are additionally included in a DU header, as compared to a conventional DU header illustrated in FIGS. 4 and 5.

Figure 10:
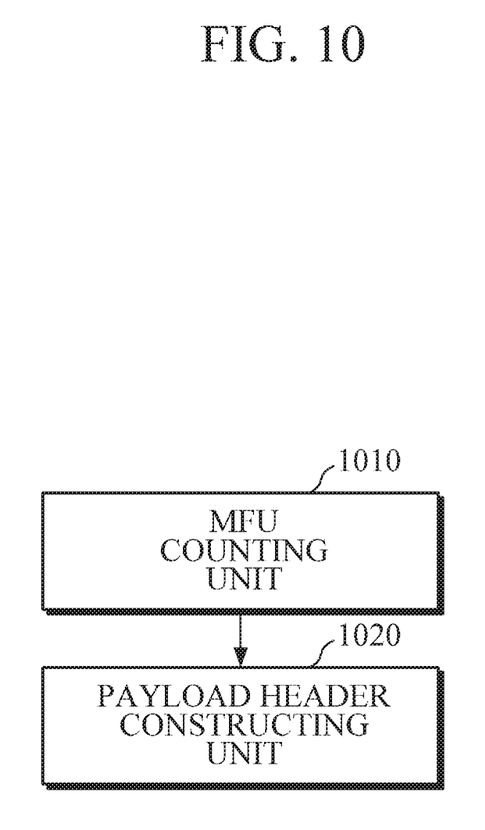
FIG. 10 is a block diagram illustrating an apparatus for forming an MMT payload header according to an exemplary embodiment.

FIG. 10 is a block diagram illustrating an apparatus for constructing an MIVIT payload header according to an exemplary embodiment. The apparatus for constructing an MMT payload header may be configured to be deployed in the delivery function layer 130 among the layers illustrated in FIG. 1.

Referring to FIG. 10, the apparatus for constructing an MIVIT payload header includes an MFU counting unit 1010 and a payload header constructing unit 1020. The MFU counting unit 1010 is an optional element, rather than an essential element, and thus the apparatus for constructing an MIVIT payload header may include only the payload header constructing unit 1020.

The MFU counting unit 1010 determines whether there are more than one media fragment unit (MFU) to be aggregated and mapped into one payload. Upon determination by the MFU counting unit 1010, there may be one MFU or one or more MFUs to be aggregated and mapped into one payload.

The payload header constructing unit 1020 includes, in an MIVIT payload header, an MPU_sequence_number which represents a sequence number of an MPU to which one or a plurality of MFUs to be aggregated and mapped into one payload belong. That is, in the exemplary embodiment, an MPU_sequence_number is included in an MIVIT payload header, rather than in a DU header. To this end, the payload header constructing unit 1020 may first extract an MPU_sequence_number of one or a plurality of MFUs, and may include the extracted MPU_sequence_number in an MIVIT payload header. In particular, even in the case where there are a plurality of MFUs to be aggregated and mapped into one payload, the payload header constructing unit 1020 generates an MIVIT payload header by including once, in an MMT payload header, an MPU_sequence_number of the MPU, to which the plurality of MFUs belong.

Further, although not illustrated in FIG. 10, a data unit header constructing unit may be further included in the apparatus. The data unit header constructing unit is configured to include an MFU sequence number of each of MFUs which are aggregated in each header of data units (DUs).

Figure 11:
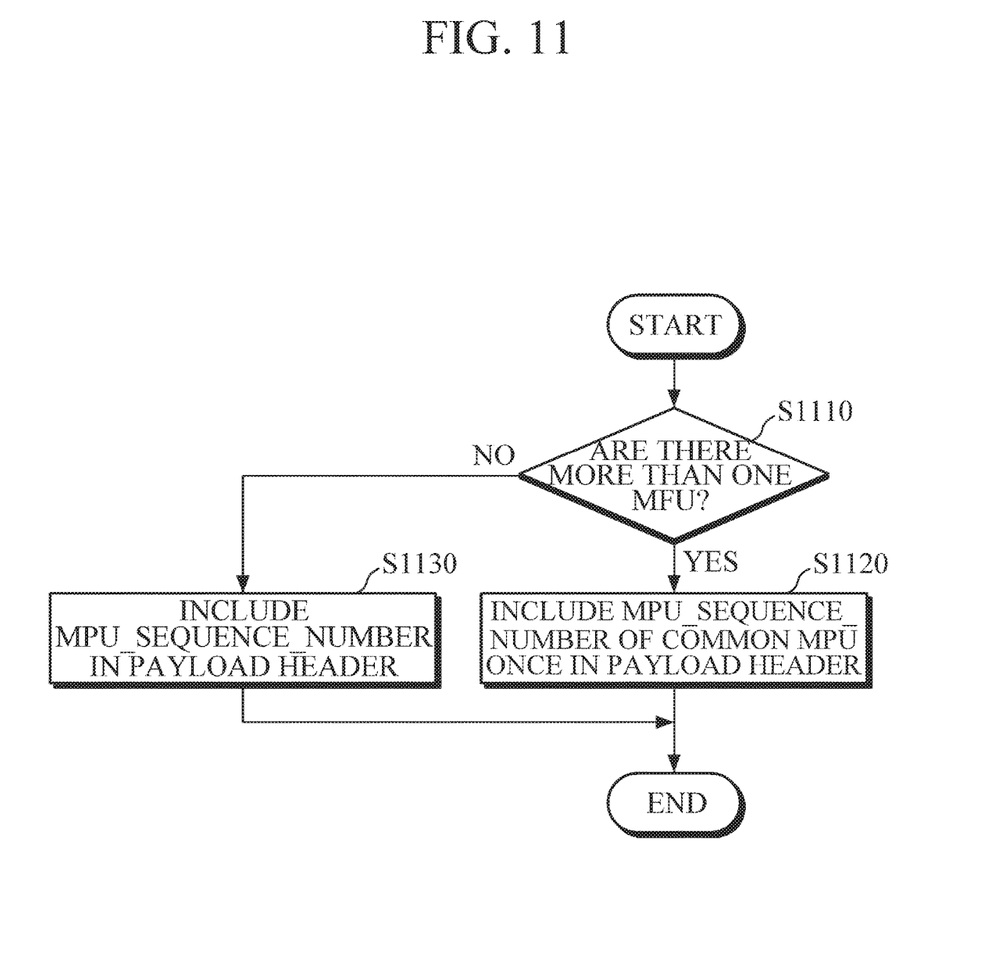
FIG. 11 is a flowchart illustrating a method of forming an MMT payload header to reduce overhead according to an exemplary embodiment.

FIG. 11 is a flowchart illustrating a method of constructing an MIVIT payload header so as to reduce overhead according to an exemplary embodiment.

Referring to FIG. 11, an apparatus for constructing an MMT payload header (hereinafter referred to as an "apparatus") determines in S1110 whether there are more than one media fragment unit (MFU) to be aggregated and mapped into one payload. As illustrated in FIG. 10, the determining whether there are more than one MFU may be performed as an optional process.

Further, regardless of whether there is one MFU or two or more MFUs, the apparatus includes, in an MIVIT payload header, an MPU_sequence_number of an MPU to which one MFU or two or more MFUs belong in S1120 and S1130. To this end, the apparatus may first extract an MPU_sequence_number of an MPU to which one MFU or two or more MFUs belong in S1120 and S1130, and may include the extracted MPU_sequence_number in an MIVIT payload header. Particularly, in an exemplary embodiment, as disclosed in S1120, in the case where there are more than one MFU to be aggregated and mapped into one payload header, i.e., even in the case where there are more than one MFU included in one packet, the apparatus includes only once, in a payload header, an MPU_sequence_number of an MPU to which two or more MFUs belong, and generates a payload header in S1120. In the case where there is one MFU to be included in one packet, the apparatus includes, in a payload header, an MPU sequence number of an MPU to which the MFU belongs, and generates a payload header in S1130.

Moreover, although not illustrated in FIG. 11, the apparatus may include an MFU_sequence_number of each of the MFUs which are aggregated in each header of data units (DUs).

The invention claimed is:

1. An apparatus for constructing an MPEG Media Transport (MMT) payload header and transmitting a multimedia packet including the MMT payload header based on an MMT system, the MMT system including an encapsulation layer and a delivery function layer, the apparatus comprising:
   at least one processor; and
   a memory storing at least one instructions executed by the at least one processor, the instructions for:
      receiving at least one data unit output from the encapsulation layer, each data unit including a data unit header;
      determining whether there are more than one Media Fragment Unit (MFU) to be aggregated and mapped into one payload in the at least one data unit;
      including once, in the MMT payload header, an Media Processing Unit (MPU sequence number of an MPU to which more than one MFU belong on the delivery function layer;
      is forming an MMT transport packet by applying the MMT payload header to MMT payload data; and
      transmitting the formed MMT transport packet,
      wherein the MFU is a container format that is independent of any specific media codecs and contains coded media data that can be independently processed by a media decoder and the MPU is a container format that contains one or more MFUs.

2. The apparatus of claim 1, wherein the at least one instructions further includes instructions for extracting, from at least one data unit header of the at least one data unit, an MPU sequence number of a MPU to which one MFU or a plurality of MFUs to be aggregated and mapped into one payload belong.

3. The apparatus of claim 1, wherein the at least one instructions further includes instructions for including a fragment sequence number of each MFU into each header of data units (DUs).

4. A method of constructing an MPEG Media Transport (MMT) payload header for transmitting a multimedia packet including the MMT payload header based on an MMT system, the MMT system including an encapsulation layer and a delivery function layer, the method comprising:
   receiving at least one data unit output from the encapsulation layer, each data unit including a data unit header;
   determining whether there are more than one Media Fragment Units (MFUs) to be aggregated and mapped into one payload in the at least one data unit;
   including once, in the MMT payload header, an Media Processing Unit (MPU sequence number of an MPU to which more than one MFU belong on the delivery function layer;
   forming an MMT transport packet by applying the MMT payload header to MMT payload data; and
   transmitting the formed MMT transport packet,
   wherein the MFU is a container format that is independent of any specific media codecs and contains coded media data that can be independently processed by a media decoder and the MPU is a container format that contains one or more MFUs.

5. The method of claim 4, further comprising extracting, from at least one data unit header of the at least one data unit, an MPU sequence number of a MPU to which one MFU or a plurality of MFUs to be aggregated and mapped into one payload belong.

6. The method of claim 4, further comprising including a fragment sequence number of each MFU into each header of data units (DUs).

* * * * *